(12) United States Patent
Herbert et al.

(10) Patent No.: US 7,979,702 B2
(45) Date of Patent: Jul. 12, 2011

(54) PROTECTING PRIVACY OF NETWORKED DEVICES CONTAINING MANAGEMENT SUBSYSTEMS

(75) Inventors: Howard Herbert, Phoenix, AZ (US); Moshe Maor, Kiryat Mozkin (IL)

(73) Assignee: Intel Corporation, Santa Clara, CA (US)

( * ) Notice: Subject to any disclaimer, the term of this patent is extended or adjusted under 35 U.S.C. 154(b) by 1119 days.

(21) Appl. No.: 11/027,452

(22) Filed: Dec. 29, 2004

(65) Prior Publication Data

US 2006/0143137 A1    Jun. 29, 2006

(51) Int. Cl.
*G06F 17/60*      (2006.01)
(52) U.S. Cl. ........... 713/166; 713/184; 726/2; 726/3; 726/8; 726/23
(58) Field of Classification Search .......... 713/166
See application file for complete search history.

(56) References Cited

U.S. PATENT DOCUMENTS

| | | | | |
|---|---|---|---|---|
| 5,136,711 | A | * | 8/1992 | Hugard et al. .............. 713/2 |
| 5,230,052 | A | | 7/1993 | Dayan et al. |
| 5,421,006 | A | | 5/1995 | Jablon |
| 5,444,764 | A | * | 8/1995 | Galecki .............. 455/411 |
| 5,586,260 | A | * | 12/1996 | Hu .................. 726/12 |
| 5,600,708 | A | * | 2/1997 | Meche et al. ........... 455/411 |
| 5,680,547 | A | * | 10/1997 | Chang ................ 709/222 |
| 5,699,595 | A | * | 12/1997 | Feyerl ................ 28/107 |
| 5,815,652 | A | | 9/1998 | Ote et al. |
| 5,898,783 | A | * | 4/1999 | Rohrbach .......... 340/5.31 |
| 5,944,822 | A | | 8/1999 | Cornils et al. |
| 6,212,635 | B1 | | 4/2001 | Reardon |
| 6,216,116 | B1 | * | 4/2001 | Barkan et al. ........... 705/76 |
| 6,272,629 | B1 | | 8/2001 | Stewart |
| 6,304,970 | B1 | | 10/2001 | Bizzaro et al. |
| 6,466,972 | B1 | | 10/2002 | Paul et al. |
| 6,574,236 | B1 | * | 6/2003 | Gosselin et al. ........... 370/465 |
| 6,574,736 | B1 | * | 6/2003 | Andrews .............. 726/21 |
| 6,611,915 | B1 | | 8/2003 | Kubik et al. |
| 6,922,722 | B1 | | 7/2005 | Mann et al. |
| 7,051,242 | B2 | * | 5/2006 | Naffziger ............. 714/47 |
| 7,089,451 | B2 | | 8/2006 | Ote et al. |
| 7,111,055 | B2 | | 9/2006 | Falkner |
| 7,185,192 | B1 | | 2/2007 | Kahn |
| 7,266,818 | B2 | | 9/2007 | Pike et al. |

(Continued)

FOREIGN PATENT DOCUMENTS

EP        675659 A1 * 10/1995

(Continued)

OTHER PUBLICATIONS

Notification of Transmittal of the International Search Report and the Written Opinion of the International Searching Authority or the Declaration, date of Mailing Jul. 14, 2006, International Application No. PCT/US2005/046573, 18 pages.

(Continued)

*Primary Examiner* — Kambiz Zand
*Assistant Examiner* — Yonas Bayou
(74) *Attorney, Agent, or Firm* — Blakely, Sokoloff, Taylor & Zafman LLP (57) ABSTRACT

In one embodiment, a method includes receiving a decommission command from a management console, determining that the decommission command is authentic, and disabling the manageability functions of a management subsystem on a managed device.

14 Claims, 5 Drawing Sheets

U.S. PATENT DOCUMENTS

| | | | |
|---|---|---|---|
| 7,284,120 | B2 | 10/2007 | Blouin et al. |
| 7,302,698 | B1 | 11/2007 | Proudler |
| 7,401,358 | B1 | 7/2008 | Christie et al. |
| 2001/0020251 | A1 | 9/2001 | Sheikh et al. |
| 2003/0028633 | A1 | 2/2003 | Lindsay et al. |
| 2003/0069951 | A1 | 4/2003 | Fong et al. |
| 2003/0091042 | A1 | 5/2003 | Lor |
| 2003/0120820 | A1 | 6/2003 | Chen |
| 2003/0120827 | A1* | 6/2003 | Fulginiti et al. ............ 709/319 |
| 2004/0010654 | A1* | 1/2004 | Yasuda et al. .................. 711/1 |
| 2004/0039911 | A1* | 2/2004 | Oka et al. ...................... 713/175 |
| 2004/0088402 | A1 | 5/2004 | Piepho et al. |
| 2004/0103175 | A1 | 5/2004 | Rothman et al. |
| 2004/0255169 | A1* | 12/2004 | Little et al. ................... 713/202 |
| 2005/0091349 | A1 | 4/2005 | Scheibil |
| 2005/0267956 | A1 | 12/2005 | Huang |
| 2006/0143263 | A1 | 6/2006 | Kumar et al. |
| 2006/0168196 | A1* | 7/2006 | Herbert et al. ............... 709/224 |
| 2006/0182108 | A1* | 8/2006 | Krumel ......................... 370/389 |

FOREIGN PATENT DOCUMENTS

| | | |
|---|---|---|
| EP | 1220556 A1 * | 7/2002 |
| EP | 1351137 A2 | 10/2003 |
| GB | 2 388 752 A | 11/2003 |
| JP | 2004046661 | 2/2004 |
| TW | 292365 | 1/1996 |
| TW | 550508 | 9/2003 |
| TW | 567438 | 12/2003 |
| TW | 574651 | 2/2004 |
| WO | WO 2004/053618 A2 | 6/2004 |

OTHER PUBLICATIONS

Notification of Transmittal of the International Search Report and the Written Opinion of the International Searching Authority or the Declaration, date of Mailing Jun. 19, 2006, International Application No. PCT/US2005/045897.

International Preliminary Report on Patentability for International Application No. PCT/US2005/046080, dated of issuance Jul. 3, 2007, 6 pages.

Written Opinion of the International Searching Authority for International Application No. PCT/US2005/046080, dated of issuance Apr. 19, 2006, 5 pages.

Intel Corporation Office Action for U.S. Appl. No. 11/026,712 mailed May 28, 2008.

Intel Corporation Office Action for U.S. Appl. No. 11/026,712 mailed May 27, 2009.

Intel Corporation Office Action for U.S. Appl. No. 11/015,872 mailed Feb. 8, 2008.

Intel Corporation Office Action for U.S. Appl. No. 11/015,872 mailed Oct. 29, 2008.

PCT Search Report, PCT/US2005/046079, mailed Jun. 6, 2006, 5 pages.

PCT Search Report, PCT/US2005/046080, mailed Apr. 20, 2006, 6 pages.

PCT Search Report, PCT US2005/046573, 4 pages.

PCT Search Report, PCT US2005/045897, 4 pages.

Intel Corporation Office Action for U.S. Appl. No. 11/026,712 mailed May 9, 2008.

Intel Corporation Office Action for U.S. Appl. No. 11/026,712 mailed Dec. 9, 2008.

Intel Corporation Office Action for U.S. Appl. No. 11/015,873 mailed Jan. 8, 2008.

Intel Corporation Office Action for U.S. Appl. No. 11/015,873 mailed Oct. 20, 2008.

Intel Corporation Office Action for U.S. Appl. No. 11/015,872 mailed Oct. 19, 2006.

Intel Corporation Office Action for U.S. Appl. No. 11/015,872 mailed Apr. 3, 2007.

Intel Corporation Office Action for U.S. Appl. No. 11/026,712 mailed Dec. 23, 2009.

* cited by examiner

PROTECTING PRIVACY OF NETWORKED DEVICES CONTAINING MANAGEMENT SUBSYSTEMS

FIELD

Embodiments of the invention relate generally to device management, and more specifically to protecting privacy of networked devices containing management subsystems.

BACKGROUND

In a corporate environment, a system administrator may need to oversee a large number of workstations. Typically, a system administrator controls proper operability of these workstations using a management console coupled to the workstations via a local network (e.g., Ethernet, Local Area Network (LAN), etc.). The management console communicates with a workstation to request data stored on the workstation when needed. For example, if an employee reports a problem with his or her personal computer (PC), the system administrator may use the management console to collect current information about this PC (e.g., current CPU usage, current memory usage, etc.) and identify the source of the problem. The management console may also request a workstation to provide certain sensitive information pertaining to a user of a relevant PC when the system administrator detects a problem with this PC and needs to notify the user about the problem. This information is typically collected by software agents running on the managed device and may include, for example, an employee number, an employee email address, an employee phone number, etc.

At a certain point of time, a company may decide to purchase new computers for its employees and donate old computers to a school or library. Alternatively, a company may decide to transfer old computers to the employees for personal use (e.g., through an employee discount purchase program). Then, the system administrator may need to reconfigure the old computers to ensure they provide an adequate privacy protection when used by new owners.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DESCRIPTION OF EMBODIMENTS

A method and apparatus for protecting privacy of networked devices containing management subsystems is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe protection of privacy of networked devices containing management subsystems in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable medium may include any mechanism for storing information in a form readable by a machine (e.g. a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EEPROM), Electrically Erasable Programmable Read-Only Memory (EEPROM), magnetic or optical cards, flash memory, or the like.

Figure 1:
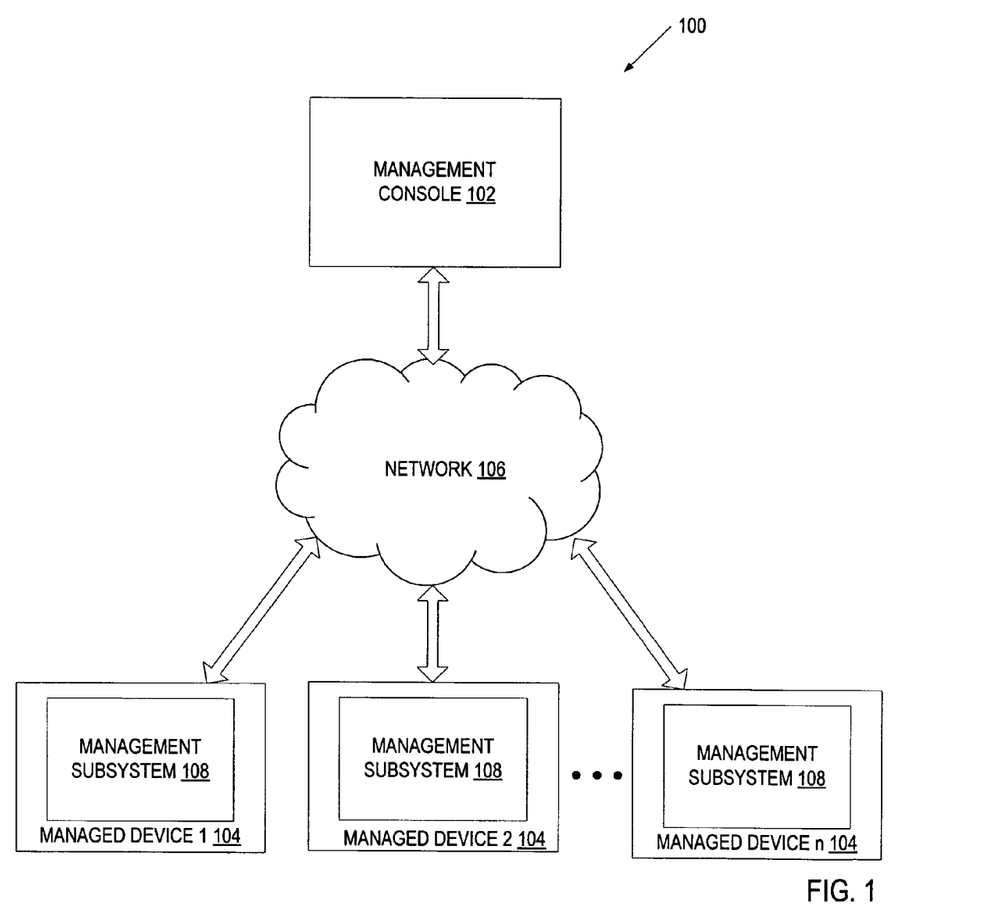
FIG. 1 illustrates a block diagram of one embodiment of a system for protecting privacy of networked devices containing management subsystems.

FIG. 1 illustrates a block diagram of one embodiment of a system 100 for protecting privacy of networked devices containing management subsystems. The system 100 includes a management console 102 coupled to multiple managed devices 104 via a network 106 (e.g., a private network such as LAN or Ethernet or a public network such as Internet).

The management console 102 may be a computer system (e.g., PC, handheld device, portable computer, set-top box, etc.) used by an information technology (IT) administrator or system administrator to control the operation of managed devices 104. In one embodiment, the management console 102 is responsible for issuing commands to the managed devices 104, including commands compatible with security mechanisms employed by the managed devices 104.

The managed devices 104 may be workstations used by employees of an organization. Each managed device 104 includes a management subsystem 108 that communicates with the management console 102. The management subsystem 108 is an embedded system that may include, for example, a microcontroller or a network controller, a set of management applications performing manageability operations requested by the management console, and a flash memory associated with the manageability operations. In one embodiment, the management subsystem 108 is responsible for receiving commands from the management console 102, authenticating the commands, and executing the commands as requested by the management console 102. The commands may include, for example, a command to turn the managed device 104 off, a command to reset the managed device 104, a command to collect configuration information pertaining to the managed device 104 (e.g., hardware parameters, etc.), a command to collect information pertaining to the user of the managed device 104 that is provided to the management subsystem 108 by software agents running on the managed device 104 (e.g., the user's email address, employee number, phone number, etc.), etc. The commands may be executed by the management subsystem 108 without the knowledge of the user of the managed device 104.

In one embodiment, the management console 102 issues a decommission command to a managed device 104 upon receiving a request from the IT administrator to disable ("decommission") manageability functions performed by a management subsystem 108 of the managed device 104. The IT administrator may need to decommission the manageability functions for the managed device 104 before transferring the managed device 104 to a new owner (e.g., to a school as a donation, to an employee for private use as part of an employee discount purchase program, etc.). The decommission command may be issued to ensure the managed device 104 provides an adequate privacy protection when used by a new owner.

Upon receiving the decommission command, the management subsystem 108 authenticates this command to verify that the source of this command is the management console 102 and the command is in proper form, and then disables manageability functions performed by the management subsystem 108. In one embodiment, the manageability functions are disabled by changing configuration parameters associated with the management subsystem 108.

In one embodiment, the disabled manageability functions include all functions performed by the management subsystem 108, and the command results in decommissioning of the entire management subsystem 108. In another embodiment, the disabled manageability functions include only functions of the management subsystem 108 that can potentially result in an inadequate privacy protection on the managed device 104. For example, the disabled manageability functions may include the submission of the information pertaining to the user of the managed device 104, but not the submission of configuration information pertaining to the managed device 104, etc.

In one embodiment, once the decommission command is executed, the management subsystem can never be reconfigured to reinstate the manageability functions. Alternatively, the manageability functions can subsequently be reinstated in response to a relevant request of the management console 102.

Figure 2:
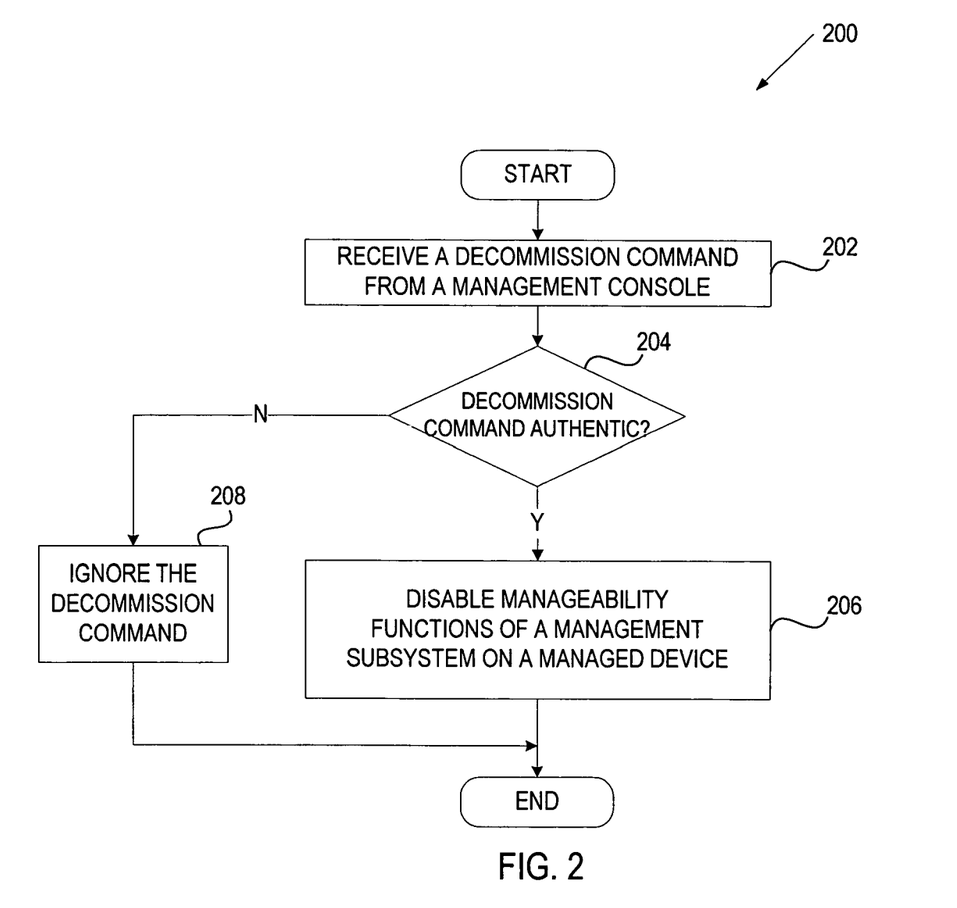
FIG. 2 is a flow diagram of one embodiment of a process for protecting privacy of a networked device.

FIG. 2 is a flow diagram of one embodiment of a process 200 for protecting privacy of a networked device. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 200 is performed by a management subsystem 108 of FIG. 1.

Referring to FIG. 2, process 200 begins with processing logic receiving a decommission command from a management console (processing block 202). In one embodiment, the decommission command is received from a host of the management subsystem. In another embodiment, the decommission command is received from a network (e.g., an enterprise network).

At processing block 204, processing logic determines whether the decommission commands is authentic. In one embodiment, processing logic makes this determination by deciding whether the decommission command has been issued by a trusted management console and whether the decommission command has a proper format.

If the decommission command is not authentic, processing logic ignores this command (processing block 208). Otherwise, if the decommission command is authentic, processing logic disables the manageability functions of a management subsystem on a managed device (processing block 206). In one embodiment, processing logic disables the manageability functions by changing configuration parameters of the management subsystem. One embodiment of disabling the manageability functions using protected word manipulation will be discussed in greater detail below in conjunction with FIG. 3.

In one embodiment, processing logic disables all functions performed by the management subsystem. In another embodiment, processing logic disables only the privacy-sensitive functions performed by the management subsystem. For example, processing logic may only preclude the management subsystem from transferring out personal information of the user of the managed device that is stored by managed device software agents on media or in locations accessible to the management subsystem (e.g., the device's random access memory (RAM) or non-volatile memory (e.g., flash), or registers of the management subsystem).

In one embodiment, processing logic disables the manageability functions permanently (e.g., prevents any subsequent re-configuration of the management subsystem). In another embodiment, processing logic allows the manageability functions to be subsequently reinstated in response to a relevant request of the management console.

Accordingly, process 200 provides privacy-sensitive transferees with the protection they need without creating weak spots through which malware or other forms of corruption could enter a managed enterprise network.

Figure 3:
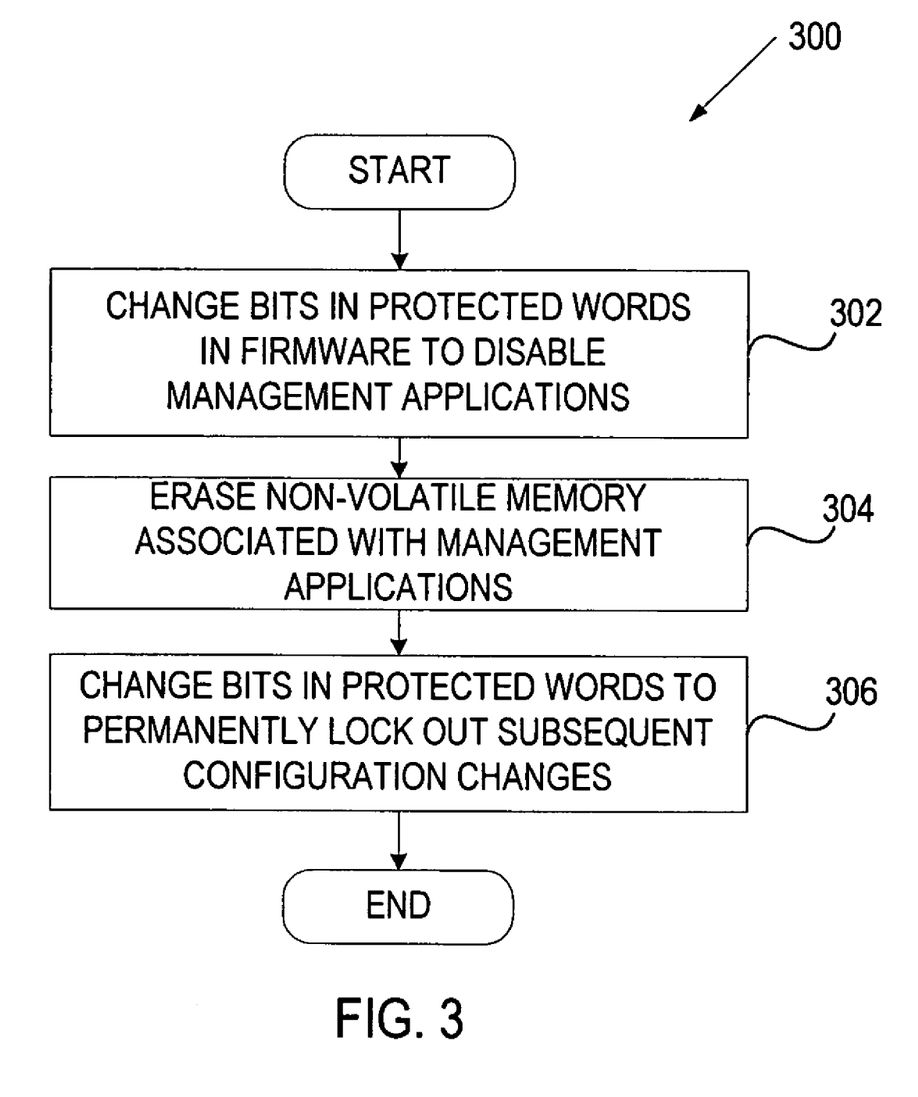
FIG. 3 is a flow diagram of one embodiment of a process for permanently disabling manageability functions performed by a management subsystem.

FIG. 3 is a flow diagram of one embodiment of a process 300 for permanently disabling manageability functions performed by a management subsystem. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 300 is performed by a management subsystem 108 of FIG. 1.

Referring to FIG. 3, process 300 begins with processing logic changing bits in protected words in memory of the managed device (processing block 302). Each protected word may correspond to a management application involving one or more tasks to be performed by the management subsystem in response to a corresponding command of the management console. By changing bits in a protected word, processing logic disables a relevant management application. In one embodiment, processing logic disables all management applications of the management subsystem. Alternatively, processing logic disables only a subset of management applications of the management subsystem.

At processing block 304, processing logic erases data in non-volatile memory (e.g., flash) that is associated with the disabled management applications.

At processing block 306, processing logic changes bits in protected words, corresponding to the configuration of the management subsystem, in memory of the managed device to permanently lock out subsequent changes to the configuration of the management subsystem. As a result, neither local nor remote software can reactivate manageability functions that may compromise privacy on the managed device.

Figure 4:
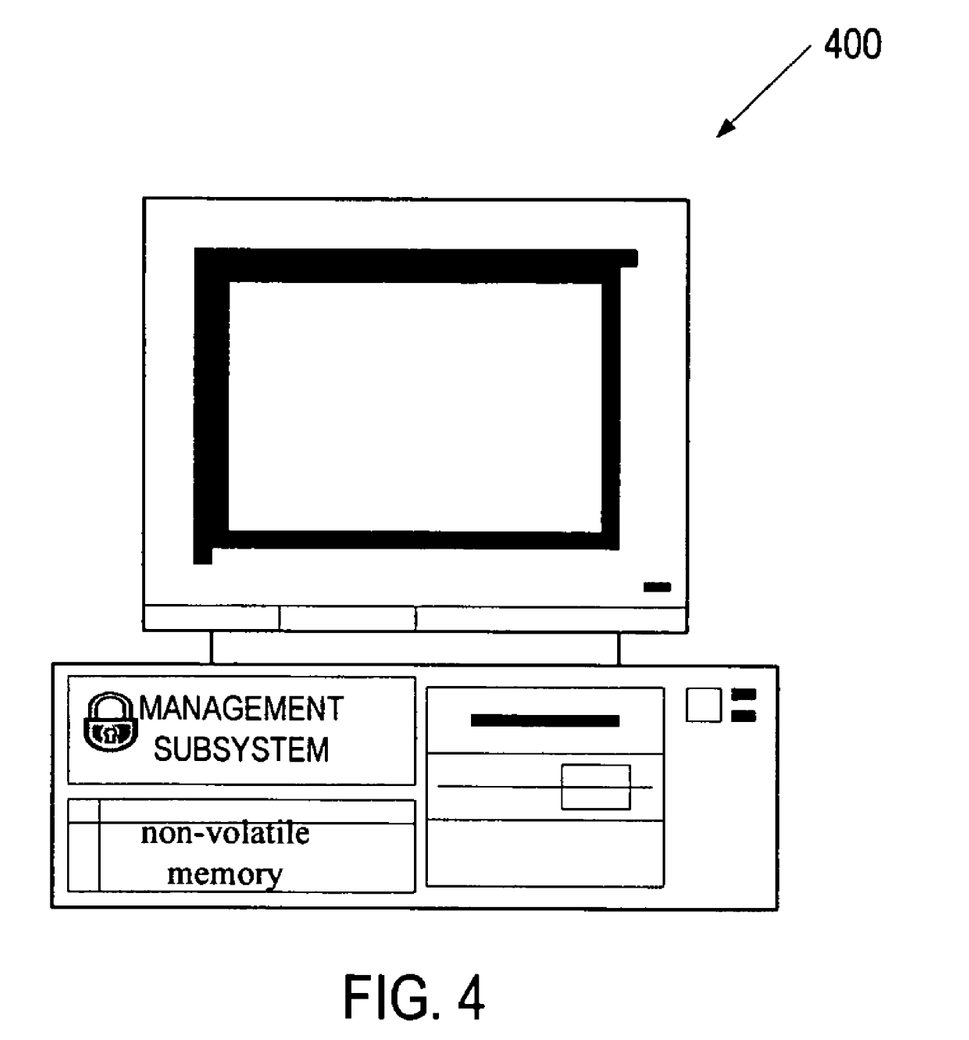
FIG. 4 illustrates a device with a decommissioned management subsystem.

FIG. 4 illustrates a device 400 in which a management subsystem has been decommissioned and non-volatile memory (e.g., flash) dedicated to manageability functions has been erased. This device when transferred to a privacy-sensitive environment ensures privacy of data for a new user of the device.

Figure 5:
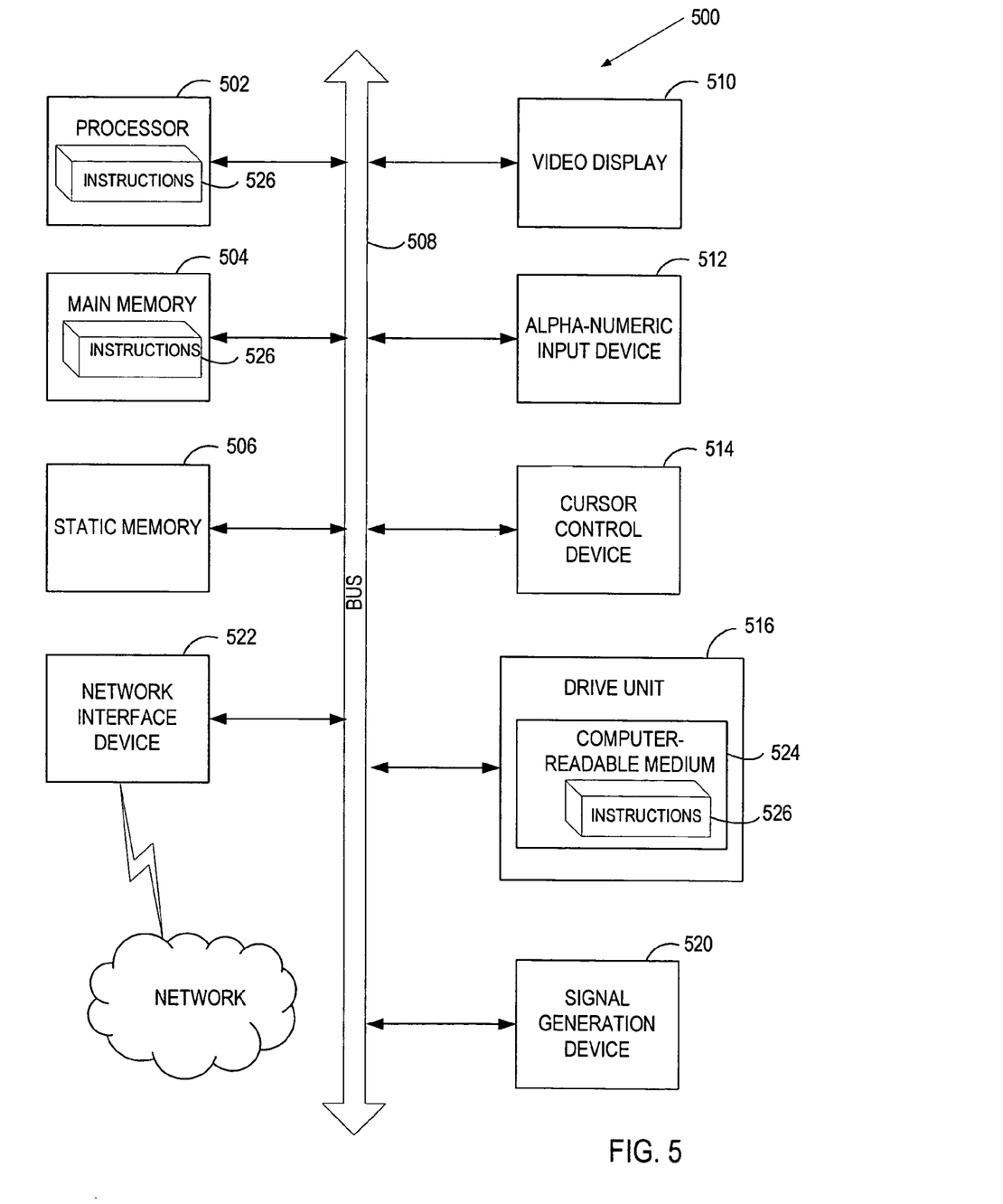
FIG. 5 is a block diagram of one embodiment of a computer system.

FIG. 5 shows a diagrammatic representation of machine in the exemplary form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 520 (e.g., a speaker) and a network interface device 522.

The disk drive unit 516 includes a machine-readable medium 524 on which is stored one or more sets of instructions (e.g., software 526) embodying any one or more of the methodologies or functions described herein. The software 526 may also reside, completely or at least partially, within the main memory 504 and/or within the processor 502 during execution thereof by the computer system 500, the main memory 504 and the processor 502 also constituting machine-readable media.

The software 526 may further be transmitted or received over a network 528 via the network interface device 522.

While the machine-readable medium 524 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and apparatus for protecting privacy of a networked device have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for protecting privacy of a user of a managed device before the managed device is transferred to a new user, the method comprising:
    receiving a decommission command to disable a manageability function of a management subsystem on the managed device, the decommission command being received from a management console, and the manageability function for providing information pertaining to the user of the managed device to the management console;
    determining that the decommission command is authentic;
    collecting user information pertaining to the user of the managed device and providing the user information to the management console; and
    disabling the manageability function of the management subsystem on the managed device, to protect privacy of the user of the managed device before the new user of the managed device uses the managed device, by:
        selectively clearing a first portion of non-volatile memory dedicated to the manageability function while leaving a second portion of non-volatile memory not dedicated to the manageability function intact to allow the management subsystem to continue to operate for other purposes; and permanently locking out subsequent changes to the configuration of the management subsystem by setting protected lockout bits located in a third portion of non-volatile memory such that neither local nor remote software can reactivate the manageability function.

2. The method of claim 1 wherein the decommission command is received via a network.

3. The method of claim 1 wherein the manageability function is a privacy-sensitive function of the management subsystem.

4. An apparatus for protecting privacy of a user of a managed device before the managed device is transferred to a new user, the apparatus comprising:
a management subsystem to receive a decommission command from a management console, to determine that the decommission command is authentic, to collect user information pertaining to the user of the managed device, to provide the user information to the management console, and to disable manageability functions of a management subsystem on the managed device, to protect privacy of the user of the managed device, before the new user of the managed device uses the managed device;
a non-volatile memory associated with the manageability functions, data dedicated to a first manageability function of the manageability functions stored on a first portion of the non-volatile memory being selectively erased by the management subsystem in response to the decommission command; and
protected lockout bits located in a second portion of the non-volatile memory, which when set permanently lock out subsequent changes to the configuration of the management subsystem such that neither local nor remote software can reactivate the first manageability function.

5. The apparatus of claim 4 wherein the decommission command is received via a network.

6. The apparatus of claim 4 wherein the first manageability function is a privacy-sensitive function of the management subsystem.

7. A machine-readable storage medium containing instructions which, when executed by a processing system, cause the processing system to perform a method for protecting privacy of a user of a managed device before the managed device is transferred to a new user, the method comprising:
receiving a decommission command to disable a manageability function of a management subsystem on the managed device, the decommission command being received from a management console, and the manageability function for providing information pertaining to the user of the managed device to the management console;
determining that the decommission command is authentic;
collecting user information pertaining to the user of the managed device and providing the user information to the management console;
disabling the manageability function of the management subsystem on the managed device by:
changing bits in protected words in firmware to disable relevant management applications;
selectively erasing portions of a non-volatile memory, wherein the portions of the non-volatile memory are associated with the relevant management applications; and
permanently locking out subsequent changes to the configuration of the management subsystem by setting protected lockout bits located in the non-volatile memory such that neither local nor remote software can reactivate manageability functions.

8. The machine-readable medium of claim 7 wherein the decommission command is received via a network.

9. The machine-readable medium of claim 7 wherein the manageability function is a privacy-sensitive function of the management subsystem.

10. The method of claim 1, wherein disabling the manageability function of the management subsystem comprises:
setting protected bits to disable management applications of the management subsystem wherein the management applications correspond to the manageability function.

11. The method of claim 1, wherein the management subsystem includes another manageability function that provides information pertaining to the configuration of the managed device to the management console, wherein the another manageability function continues to operate after the manageability function has been disabled.

12. The method of claim 1, wherein the second portion of non-volatile memory not dedicated to the manageability function includes a fourth portion of non-volatile memory dedicated to the second manageability function.

13. The method of claim 1, wherein disabling the manageability function of the management subsystem on the managed device comprises:
disabling a subset of management applications of the management subsystem.

14. The method of claim 4, wherein the management subsystem includes a second manageability function that provides information pertaining to the configuration of the managed device to the management console, wherein the second manageability function continues to operate after the data dedicated to the first manageability function has been selectively erased by the management subsystem.

* * * * *